United States Patent [19]

Roos et al.

[11] Patent Number: 5,066,222

[45] Date of Patent: Nov. 19, 1991

[54] METHOD AND APPARATUS FOR HEATING AND CONVEYING PLASTIC PREFORMS PRIOR TO MOLD BLOWING OPERATIONS

[75] Inventors: Uwe-Volker Roos, Bodenteich; Franz Gittner, Soltendieck, both of Fed. Rep. of Germany

[73] Assignee: Bekum Maschinenfabriken GmbH, Berlin, Fed. Rep. of Germany

[21] Appl. No.: 493,343

[22] Filed: Mar. 14, 1990

[30] Foreign Application Priority Data

| Mar. 14, 1989 | [DE] | Fed. Rep. of Germany | ....... 3908219 |
| Mar. 15, 1989 | [DE] | Fed. Rep. of Germany | ....... 3908345 |
| Mar. 30, 1989 | [DE] | Fed. Rep. of Germany | ....... 3910293 |

[51] Int. Cl.$^5$ ............................................... F27D 5/00
[52] U.S. Cl. ......................................... 432/5; 432/10; 432/224
[58] Field of Search ...................... 432/5, 6, 9, 10, 224, 432/225, 147, 229

[56] References Cited

U.S. PATENT DOCUMENTS

| 3,761,550 | 9/1973 | Seefluth | ................................ 432/10 |
| 4,846,656 | 7/1989 | Denis et al. | ......................... 432/224 |
| 4,923,395 | 5/1990 | Coxhead et al. | ......................... 432/5 |

Primary Examiner—Henry C. Yuen
Attorney, Agent, or Firm—Penrose L. Albright

[57] ABSTRACT

A process and apparatus for heating injected, cold preform blanks to blow molding temperature on a conveyor path wherein they are thereafter fed to a blow mold, the preform blanks being first heated to a temperature below the blow moulding temperature, then cooled and later reheated to a temperature slightly above the blow molding temperature, whereupon the preform blanks are allowed to equalize in temperature inside and out or are caused to do so by slightly cooling their outsides. The spacing on the holders on the conveyor chain, on which are mounted the preform blanks, is selectively adjustable to avoid heat radiation losses. The neck portions of the mounted preform blanks are surrounded completely by protective sheathings so that such neck portions are not heated while being conveyed to the blow mold.

3 Claims, 3 Drawing Sheets

METHOD AND APPARATUS FOR HEATING AND CONVEYING PLASTIC PREFORMS PRIOR TO MOLD BLOWING OPERATIONS

FIELD OF THE INVENTION

This invention relates to a method and apparatus for heating thermoplastic preform blanks and particularly to such a method and apparatus that employ a special heat treatment technique to prepare the preform blanks for blow molding.

BACKGROUND OF THE INVENTION

When producing hollow articles of synthetic resins by the blow mold method, that is, by blow molding a preform blank in a subdivided blow mold, the process takes place "under certain heat conditions". In other words, the blank, upon being pressed out of the blowing head of an extruder, is transferred in segments, either continuously or intermittently, in a warm plastic state into the blow mold as a deformable blank, and is subsequently inflated from this state within the blow mold cavity into a completed hollow article. Similarly in known extrusion blowing methods, an injected preform blank is transferred by the injection-blowing method in its warm state from the injection point into the blow mold and there it is inflated into a hollow article as defined by the configuration of the blow mold cavity. In many cases, between formation of the preform blank and the blow molding station, a processing station is provided, which either cools those preform blanks which are too hot relative to the correct blow molding temperature, or reheats substantially cooled preform blanks. This method is used especially in the case of so-called "rack blowing" or "stretch blowing", wherein preform blanks are racked inside the blow mold in a longitudinal direction before being inflated, whereby a "racking" of the plastic molecules occurs, thereby obtaining better mechanical and frequently also better visual properties (for instance, higher strength and better transparency) in the completed article as compared with other methods.

Recently, however, manufacturers have returned to the earlier method of first producing perform blanks, reheating these blanks from the cold state, then feeding them into a blow mold—a method which is presently generally termed the "reheat method."

This "reheat method" has the advantage that a greater industrial output than previously attained can be achieved This is so inasmuch as the cycle time of the machine is no longer dependent on the discharge velocity of plasticized material in the extruder from the nozzle of the blowing head, it being possible for a plurality of extruders independently to produce preform blanks for one blow molding machine Another advantage resides in circumstance that with the production of hollow articles having openings, such as flasks, bottles, containers, canisters or the like, the threaded portion can be produced with greater precision by injection molding machines, the finished blank being transferred to the blow mold already threaded, thus avoiding the requirement to form the thread in the blow mold process as such. Therefore, the blow molding time can be reduced because the neck part generally has the thickest cross section in the completed hollow article and, when blow molded, it requires the most time for cooling which must be achieved before the hollow article can be safely removed from the blow mold without a likelihood of deformation.

In the reheat method, cold preform blanks removed from a supply source are reheated to the blow molding temperature, generally by infrared radiation which reheats the preform blanks in a least relatively minimal time duration as consistent with achieving same in the most nearly uniform manner. In this case, "uniform manner" means uniform heating both over the axial length of the preform blank as well as through its thickness.

It is a challenging manufacturing problem to achieve an equalized predetermined temperature throughout the entire cross section of the article because the preform blank, as it is conveyed past a heating element and rotates on its axis, is only heated on the outside. This creates a temperature gradient throughout the article's cross section which, with the subsequent stretching or racking and inflation, has a negative effect on the quality of the hollow article to be produced. The inside of the preform blank with its lower temperature during the stretching or racking and inflation reacts differently than the outer, more heated, or, so-to-speak, the "hot" side; and in being stretched out of its natural shape, during inflation, the inner portion of the preform blank resists the stretching more than the outside part. This results in the occurrence of non-flexible areas which adversely affect the strength and appearance of the hollow articles To counteract this, the outside of the preform blank (according to the state of the art) is heated by infrared radiation to a sufficiently high temperature to ensure that desirable deformation occurs in the inner part of the wall as well as the outer part. With many materials used for the production of high quality articles, such as PET, however, the outside of the preform blank should not be heated too much because this material is inclined to recrystallize at higher temperatures, causing brittleness in the finished hollow article and leading to hairline fractures or the like. For that reason, it is also known (as disclosed in U.S. Pat. No. 4,079,104 of May 14, 1978, to Dickson et al) to superimpose an air or gas cooling system on the infrared heating element in a manner that the cooling of the outer side of the wall occurs simultaneously with the heating of the blank as a whole. For instance, coolant air is blown on the outer surface of the preform blank in the space between it and the infrared radiation system, arranged parallel to the surface of the preform blank, and the preform blank, while being guided past the infrared radiating system, is rotated on its vertical axis so that while one side is heated by the infrared radiation system, the opposite side is cooled by an air stream.

This known method is not, however, without its disadvantages. It does not allow for sensitive adjustments to different conditions, depending not only upon the length and diameter of the preform blank, but also on the thickness of its walls, as well as the conditions of the surrounding manufacturing environment. For example, certain adjustments should be made depending upon whether the machine is operated during the morning shift or during the warmer afternoon shift or, on the other hand, during the cooler night shift. Especially, however, with increasing dimensions in the cross section of the preform blank, the known method entails certain risks For cross sections of about three millimeters or greater, which are not infrequently encountered in practice, to heat the inside wall adequately, the outer wall must be heated to such a high temperature that, despite the simultaneous cooling, at least some of the problems which arise with overheating cannot be avoided.

The aforesaid U.S. Pat. No. 4,079,104 of May 14, 1978, to Dickson et al and U.S. Pat. No. 4,076,071 of Feb. 28, 1978, to Rosenkranz et al are representative of the skill of the art and, to such extent, are incorporated by reference herein.

SUMMARY OF THE INVENTION

An important object of the invention relates to a process for the heating the preform blanks by a reheat method, which raises the blanks bodies to their correct blow molding temperatures without the danger of overheating the outer sides of the blanks.

According to the invention, the preform blanks are heated while being conveyed to the blow mold; they are first heated to a temperature below the blow molding temperature which is being used then cooled, next, subsequent to that cooling, they are again heated to a temperature which is slightly higher than blow molding temperature. Finally, to permit equalization of temperatures in the outside wall and the inside wall at the blow molding temperature, the blanks are allowed to cool or provision is made slightly to cool them before they are transferred into the blow mold.

The reheat method has an advantage among others, that the cycle time of the device as a whole and the entire process for blow molding the blanks is predetermined by the operational efficiency, or capacity, of the blow mold station itself, and not by the production of the preform blanks—which, according to the reheat method, can be made available in sufficient quantity, being provided by a separate process.

A disadvantage of the reheat method involves the cost of reheating the preform blanks which can require significant energy consumption.

A variety of different types of articles have been produced with a device in accordance with the invention, wherein the articles are inflated from different shapes and sizes of preform blanks, and with the modifications in the production program, the machine, especially at the blow mold station, and process are readily adaptable to such product variety and modifications. The cross sections of preform blanks which are used in this case may differ considerably. With prior art blow molding machines, holders for preform blanks on the conveyor are spaced sufficiently from one another so that even the largest preform blanks with the maximum cross sectional dimensions can be mounted onto the holders without crowding. The result is that considerable space on the conveyor is wasted when processing preform blanks of smaller cross section or overall dimensions, and the degree of the efficiency of the infrared radiator is, as a result, also substantially lower.

Moreover, heat radiation passing between the preform blanks is not only lost, which naturally has an adverse affect on the system's efficiency, but heat energy which is not received by the perform blanks is received by reflectors arranged on the other side of the conveyed preform blanks which face the infrared radiation system. The reflections are located and function to protect machine parts of the device to avoid overheating same. Heat energy reflected by these reflectors is not appropriate to effect the desired heating of the preform blanks, such heating effect being neither precisely determinable nor controllable. Hence, the reflected radiation imposes on the system, as a whole, undesirable and unwanted effects.

In the device according to the present invention, the spacing of the holders for the preform blanks provided on the conveyor can be varied, in the sense that the dimensions of the spaces can be adjusted to different cross sections and different overall dimensions of the preform blanks to be heated, and thus also adjusted to minimize the heating impact of the intermediate spaces between the blanks which occurs as they are conveyed through the heater. As a result of this reduction in the extent of the total intermediate space between the blanks, not only is the efficiency of the infrared radiators increased, but also the undesirable effects of reflected heat are decreased. This, is turn, decreases an incidental undesirably heating of machine parts that contributes to the difficulties which arise in the heating of the preform.

The conveyor for the preform blanks comprises at least one conveyor chain which moves the preform blanks intermittently along a straight path into and through the heat radiating systems. The velocity of the conveyor chain and the preform blanks thereon is controlled to correspond to relevant operating conditions.

When preform blanks of smaller cross sectional dimensions are to be processed, the arrangement can be such that one holder is fastened, in turn, on each of a pair of adjacent chain members of the conveyor chain, which holder is also readily dismountable to permit the conveyor to be efficiently adapted for the processing of larger preform blanks. The holders in this case are almost in engagement with each other, with only sufficient space left between them so that movement of the conveyor chain is not constrained. Then, when an associated segment of a holder is mounted on each chain member or, more specifically, when an associated segment of a holder is considered with sheathing or other parts included therewith, the spacing of the holders may be adjusted so that the midpoints of the holders have a distance of forty-four millimeters between them. This "44-stitch" is suitable for the smallest preform blanks which have a diameter of up to about forty-two millimeters.

When larger preform blanks are to be processed, the conveyor chain is readily rearranged by mounting the same holders on the conveyor so that there is one chain member provided between adjacent holders, whereby the midpoints of the holders are no spaced apart sixty-six millimeters.

For the processing preform blanks of still greater cross sectional dimensions, the arrangement is that two chain members are provided between adjacent holders, so that the midpoints of the holders are spaced eighty-eight millimeters apart. Adapting the conveyor chain to different sizes of preform blanks is thus accomplished with remarkably little labor, essentially simply effecting changes to the holders to obtain "44-stitch," "66-stitch" or "88-stitch" spacings, as desired. A conveyor chain with a "44-stitch" spacing can also be used in a similar manner for an "88-stitch" spacing, wherein a preform blank is fastened only to each alternate holder.

Inasmuch as, with variations in diameters of the preform blanks, the cross sectional dimensions of heated areas which are mounted on receiving mandrels of the holders generally also vary, it is preferable that these receiving mandrels be detachably received by the holders on a crank, or lifting journal, which extend through the holders. To simplify interchangeability, it is further preferable to fasten the receiving mandrel to the crank or lifting journal by means of a snap closure.

A reflector sheathing may be attached to the holder, which is provided with an annular recess in which the reflector sheathing is detachably fastened, preferably by means of a snap closure. During the passage of the preform blank through the heating station, the reflector sheathing surrounds the blank's neck portion and is spaced a short distance therefrom, which protect the neck portion from undesirable heating, as explained hereinafter.

As a result of the uncomplicated, interchangeable mountings for the receiving mandrels and the reflector sheathings, selected of these structural parts are attachable to the holders in a very short time period to correspond to preform blanks of different dimensions.

In a further embodiment, the invention includes a gripping device which is provided at a pick-up station that is arranged in sequence after the heating station, to lift the preform blanks from the receiving mandrels, the mandrels being raised by means of a lifting device so that the neck portion is disposed above the reflector sheathing during this operation, whereupon the gripping device engages and holds the neck portion, while the receiving mandrel is retracted. The gripping device then moves the preform blanks essentially at a right angle to the direction of movement of the moving conveyor chain and to a correspondingly higher level to at least one blow mold station.

The device, according to the invention, can be provided with two sequentially arranged conveyor chains and with two blow mold stations which are arranged on both sides of the pick-up station and which can be provided with heated preform blanks alternately by the gripping device. In this case, the cycle of the conveyor chains, the lifting device, the gripping device and the two blow mold stations, as well as the processes of the heating stations, are arranged to interact with one another, and the device, with its two blow molding stations, is capable of achieving a very high rate of output.

As explained above, the reheat method has the advantage that for the production of hollow articles with filling openings and discharge openings such as, for instance, flasks, the neck portion, which may have threading, has already been produced on the end of the preform blank by the injection molding machine, and this molding aspect need not be further modified in the blow mold. To avoid the neck portion being exposed directly to the infrared radiation of the heaters during its passage through the heating stations, it is known (as disclosed in U.S. Pat. No. 4,076,071) to hold the preform blanks on the receiving mandrels, whereby the neck portions of the preform blanks are located beneath the plane of the radiation. In this manner, excessive heating of neck portions to temperatures as high as the main portion of the preform blank, which is now located above the neck portion, is prevented, and the preform blank is subsequently inflated into the desired hollow article. But, in this case, the neck portion is necessarily also heated, at least, to some degree because the heat energy from the infrared radiation systems is diffused. This heating which occurs at the neck portion is undesirable inasmuch as in the further processing of the preform blank during its removal from the mandrel, it can lead to undesirable deformations that may result in the produced article being useless.

Thus, a further purpose of the present invention resides in the development of the device of the aforementioned type so that the neck portion of the preform blank is protected optionally against the effects of heat radiation. For this purpose, according to the invention, the preform blank, which is mounted on the receiving mandrel during its passage through the heating station, is surrounded by a protective sheathing which protects the neck portion both against direct heat radiation from the infrared radiation systems and also against reflected heat in its passage through the heating system. When the inside diameter of the protective sheathing is only slightly more than the maximum outside diameter of the neck portion of the preform blank, it can be reliably assumed that the neck portion will not be damaged by heat radiation. A very small measure of heating of the neck portion, nevertheless, takes place due to heat conduction within the preform blank. But this does not lead to such temperatures that decrease the neck portion's strength to an unacceptable degree.

So that the protective sheathing, which is exposed to the direct heat radiation in lieu of the neck portion of the preform blank, is not heated to such an extent that it, in turn, radiates undesirable heat energy to the neck portion, the protective sheathing preferably is composed of a steel, the outside surface of which can be very smoothly polished, as a mirror, so that the heat radiation is almost completely reflected.

Following its passage through the heating stations, the preform blank, which is heated to blow molding temperature (with the exception of the neck portion), is removed from the receiving mandrel and passed on to the blow mold station This must be, as explained above, executed so that the preform blank is not distorted during this process, and this process must occur at high velocity to avoid any significant reduction in the operational work capacity of the device. To meet these requirements for the arrangement of the protective sheathing around the neck portion of the preform blank, it is preferable that the receiving mandrel be axially movable relative to the protective sheathing, and the protective sheathing be securely mounted relative to the conveyor itself.

The receiving mandrel can be provided with a crank or lifting journal which projects into the inside of the closed conveyor chain, while a lifting device (preferably forked) is arranged in the area of the pick-up station to raise the crank or lifting journal sufficiently so that the entire neck portion of the mounted preform blank is disposed above the top edge of the protective sheathing.

For lifting the preform blank and for its transfer into the blow mold station, a gripping device is arranged between the pick-up station and the blow mold station and is movable in a plane at the level of the neck portion of the preform blank when it is in its raised state. Consequently, with this construction the preform blank is lifted by the gripper arm, while the neck portion remains in a relatively unheated state, whereupon the crank or lifting journal returns to its starting position with the receiving mandrel connected therewith. The preform blank is then removed from the receiving mandrel, whereupon it can be transferred over in this same plane into the blow mold station without obstruction by the protective sheathing.

The operation described above is simplified in that the conveyor device advances intermittently with the aid of a stepping switch, and the work cycle of the conveyor device is, of course, coordinated with the timing of the lifting device, as well as the devices for transferring the preform blanks and the blow mold station. According to the invention, it is provided that the lifting device and the device for pick-up of the preform blanks are controlled pneumatically, whereas the transfer is controlled by a hydraulic operation, the ultimate control being provided by a micro-processor wherein article dependent data is stored, which is recalled by the applicable program to provide precise repeatability for future production of the same article.

The heating station is preferably arranged in a straight line alignment with the conveyor path for the preform blanks, and it is as advantageous to transfer the preform blanks from the conveyor, preferably at right angles to its direction of movement, to the blow mold station.

For a better appreciation of the present invention, and to understand how it may be carried into effect, reference is now made to the accompanying drawings, in which:

DESCRIPTION OF THE PREFERRED EMBODIMENTS

Figure 1:
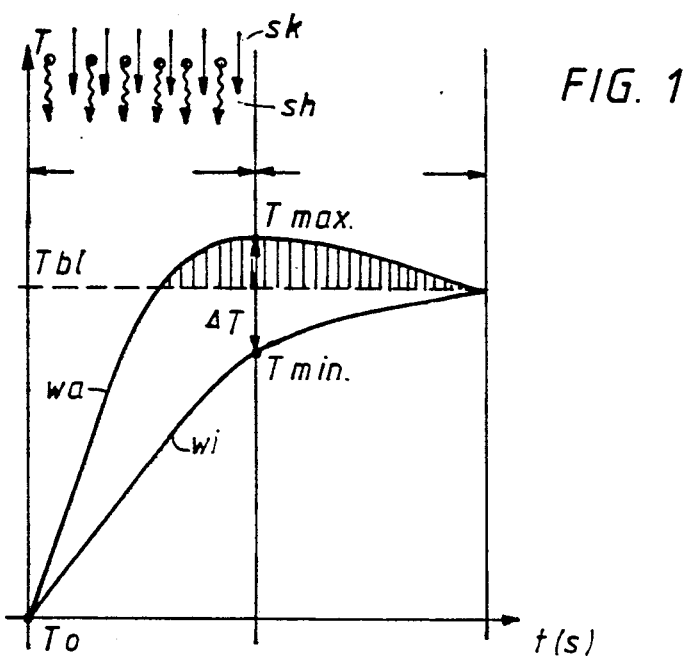
FIG. 1 is a temperature-time diagram of the heating of the outside and inside wall portions of a preform blank according to the prior art.

According to the state-of-the-art, the process of heating a preform blank, considering the relationship of the temperature/time curve for the outside wall wa, which is exposed to the direct infrared radiation sh and the inside wall wi, which is heated only by convection and conduction, is shown by the graph in FIG. 1. Consequently, in regarding the heating section in which the infrared radiation systems are mounted, the outside wall wa of the preform blank is at the initial temperature To at which the preform blank was withdrawn from the supply source. It is then heated to a temperature T max, which is considerably above the temperature T bl required for inflation at a proper temperature. The inside wall temperature wi, however, does not reach a T min temperature until the preform blank leaves the heating section, and T min is still considerably below the temperature required for the inflation. A temperature gradient of $\Delta T$ is formed. In the so-called "compensation section" following the heating section, then the temperature wa of the preform blank falls slowly until it reaches blow molding temperature T bl, while a sufficient degree of stored heat in the cross section of the material of the preform blank further heats the inside wall wi until it too has reached the blow molding temperature T bl.

If the outside wall of the blank had not been heated up to T max, the curve wi would not at its end merge with the curve wa. In other words, a temperature gradient would continue to exist between the inner and outer aspects of the wall. Therefore, to prevent T max from being even more, and to equalize the temperature of the inner and outer aspects of the wall, the outer wall is simultaneously cooled with air or gas jets sk.

Figure 2:
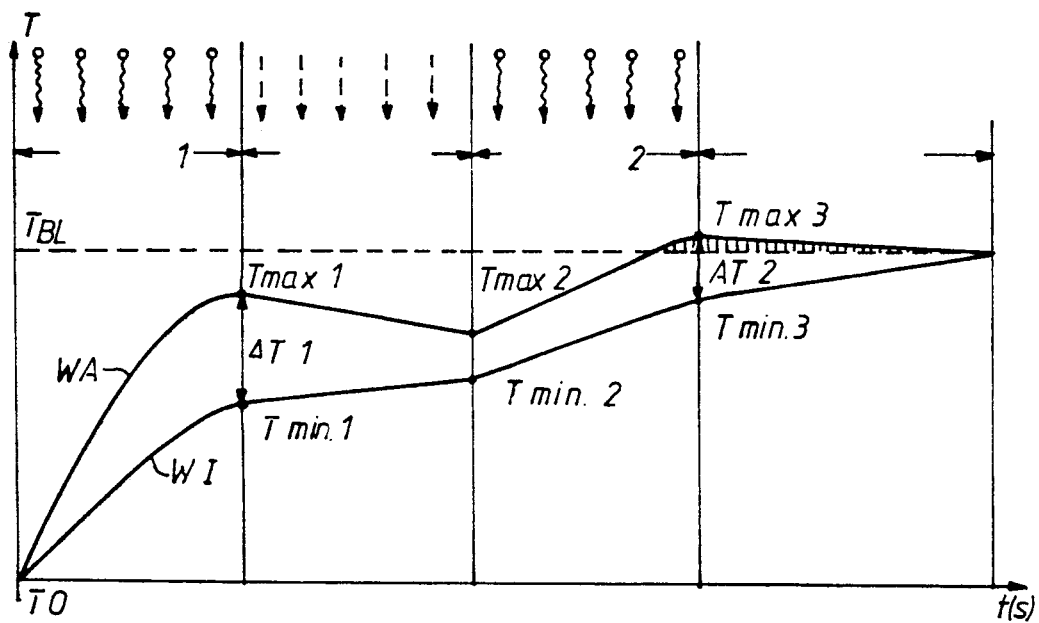
FIG. 2 is a temperature-time diagram of the heating of the outside and inside wall portions of a preform blank according to the invention.

With the method, according to the invention, as illustrated in the graph of FIG. 2, the outside wall WA of the preform blank is heated in a heating section 1 to a temperature T max 1, which still is below the temperature T BL required for inflation, and accordingly the inside wall WT reaches temperature T min 1. Next, in accordance with the invention, a cooling section follows the heating section, in which the temperature of the outside wall WA drops to a level of T max 2, while the temperature of the inside wall WI undergoes a small increase, as compared with the outside wall in the heating section and rises further to a temperature T min 2. From this higher temperature, as compared with initial temperature TO, the preform blank passes into a second heating section 2, in which the temperature is increased even further to a temperature T max 3, which is only slightly higher than blow molding temperature T bl, so that no danger exists of overheating the outside surface of the preform blank. The temperature of the inside wall WI also simultaneously rises further to the temperature T min 3.

After leaving the heating section 2, the preform blank slowly cools in a further compensation section, to blow molding temperature T BL, and the inside wall temperature slightly increases until it reaches this same temperature.

With the aid of the method, according to the invention, adjusting, to a certain degree "nursing," the blow molding process to a temperature which is most favorable to the processed material being used, taking its special properties into account in a detailed manner, is made possible. Thus, for instance, the curve for processing thick-walled preform blanks in the most desirable manner may deviate from the representation shown in FIG. 2. Upon leaving the first heating section, T max 1 and T min 1 will be lower, and cooling of the preforms in the cooling section is less than described above. In any case, the "overheating belly" which is beyond the T BL-limit, indicated in the FIGS. 1 and 2 by the vertical hatch lines, can be reduced considerably in the method according to the invention.

Figure 3:
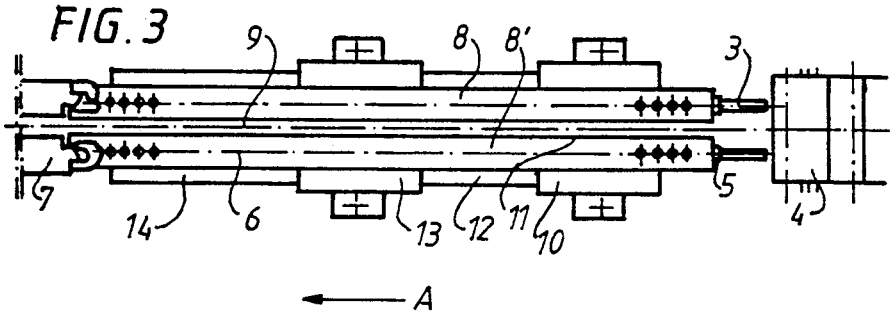
FIG. 3 is a plan view of a heating section of a reheat-blow-molding machine according to the invention.

A device for carrying out the method according to the invention is shown in FIG. 3. Preform blanks 3, produced beforehand by the injection method, pass through a feed 4 which sorts and aligns them on holder mandrels 5, arranged sequentially with identical spacing and which are mounted on conveyor chains 6. These chains 6 move in the direction of arrow A toward member 7, which lifts the preform blanks following the heating process and feeds them to a blow molding unit (not shown in this drawing). During their transport on conveyor chains 6, holder mandrels 5, along with the preform blanks 3, are rotated many times around their axes. Two paths, 8 and 8' are shown in this example. In other words, two series of preform blanks are being heated simultaneously. Because of this, paths 8 and 8' are separated from each other by a wall 9.

A first heating section is connected with feed 4 that supplies preform blanks 3. This heating section comprises an infrared radiation system, block or panel 10, as well as a surface 11 which reflects the radiant heat energy onto the space between dividing wall 9 and block 10. Upon leaving the first heating section, the preform blanks are received in a cooling section, wherein a cooling device 12 creates a flow of cooling air or cooling gas which impinges on the preform blanks. Preform blanks are then reheated in a second heating section comprising a radiation block 13. A temperature equalizing, compensation section 14 follows the second heating section and in section 14, normally, the preform blanks are not subjected to further heating or cooling. But a second cooling device may optionally be located here for the exceptional cases wherein a slight amount of further cooling is desirable.

Figure 4:
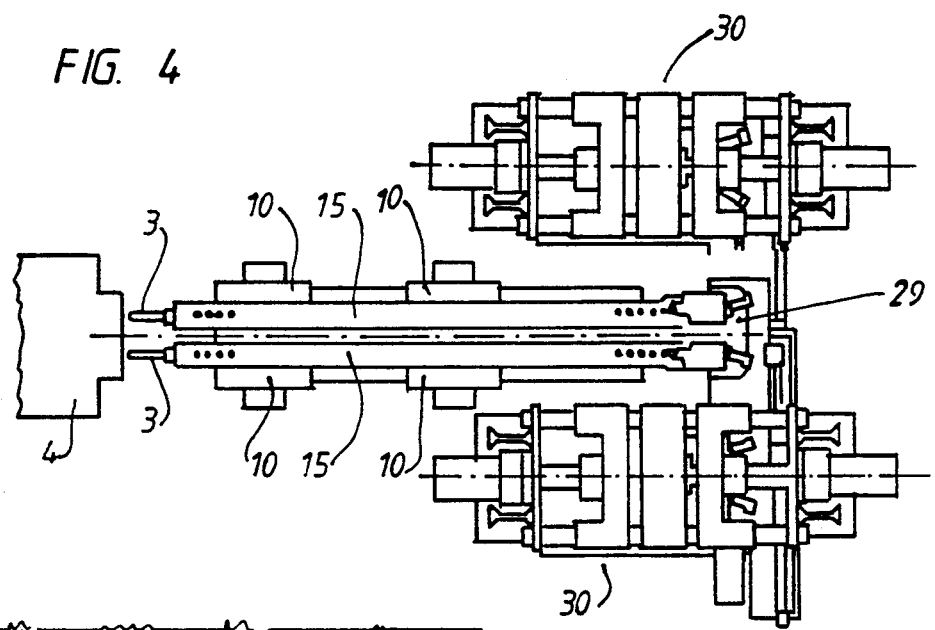
FIG. 4 is a view of a reheat-blow-molding device with two conveyor chains and two blow mold stations in accordance with the invention.

Referring now to FIG. 4, another device, according to the invention, for the blow molding of prefabricated preform blanks having further individual features, is illustrated. Another feed as described above, is shown in FIG. 4 which again is designated as feed 4. This feed 4 mounts two preform blanks 3 on holding mandrels, which are not shown in detail in the drawing. Each holding mandrel is associated with a conveyor belt or chain 15 Preform blanks 3 are carried in stages through two sequential infrared radiation systems 10 where they are heated, as described above, in stages 1 and 2 of FIG. 2, to blow molding temperature. At the end of the conveyor chains 15 the preform blanks are grasped by a gripper device 29 which feeds them alternately to the two blow mold stations 30, where preform blanks 3 are inflated into completed articles. The direction of movement of gripper device 29 is thus operationally perpendicular to the movement of conveyor chains 15.

Figure 5A:
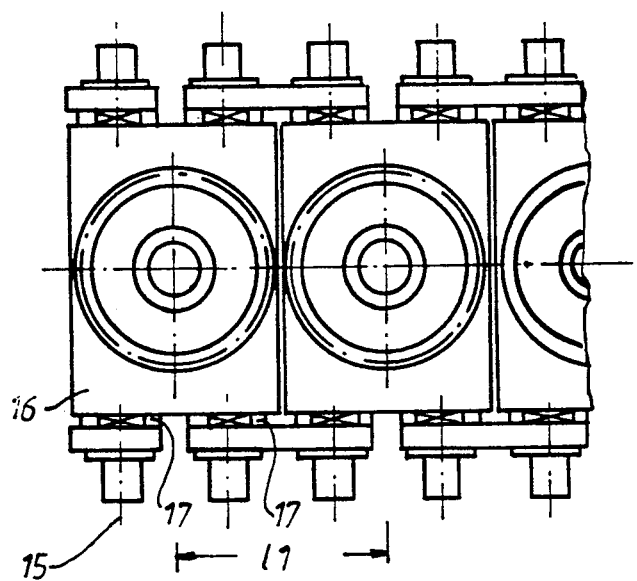
FIGS. 5A, 5B and 5C are views of sections of a conveyor chain with different sizes of space provided between the holders.
Figure 5B:
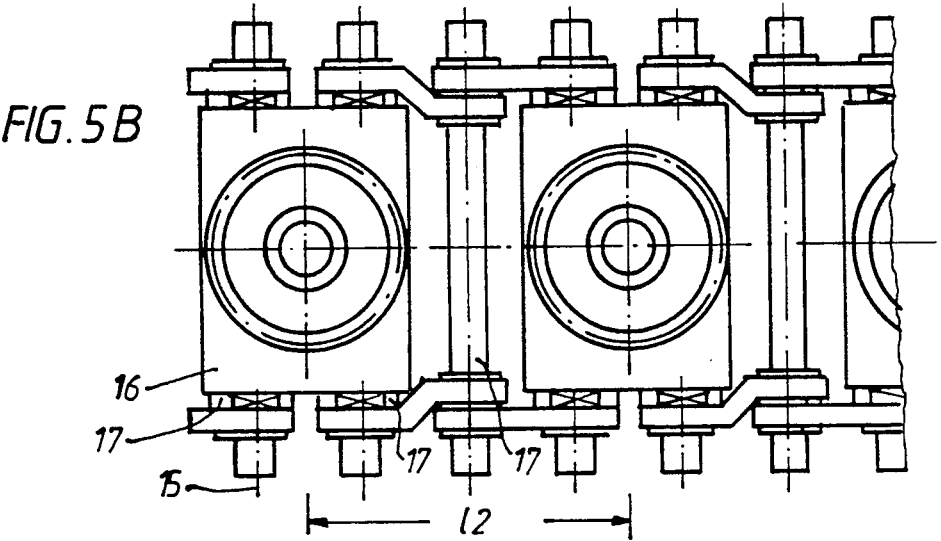
Figure 5C:
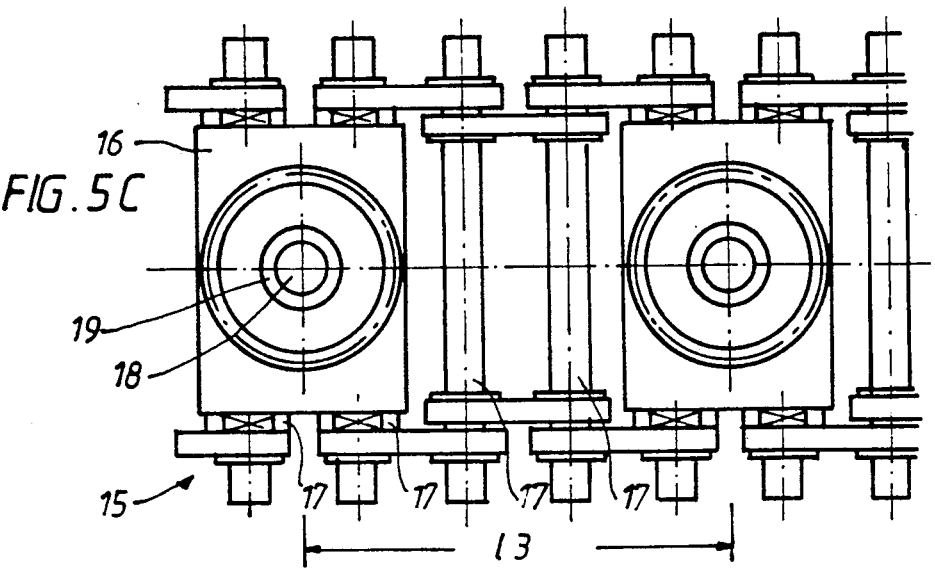

Segments of conveyor chain 15 are shown in FIGS. 5A, 5B and 5C, onto which the holders 16 are secured so as to be spaced differently from one another, whereby the intermediate space between preform blanks of different diameters mounted thereupon may be minimized.

A holder 16 is mounted in FIG. 5A on two adjacent chain members 17 so that holders 16 are spaced at such a distance from each other, considered in the direction of movement of the conveyor chain whereby movement of the conveyor chain is not constrained. The space designated by reference numeral 11 is the distance between the midpoints of any two holders 16. In this case it is forty-four millimeters. With this arrangement, preform blanks having diameters up to approximately forty-four millimeters can be processed.

The arrangement shown in FIG. 5B is for the processing of preform blanks of medium sizes wherein the diameters are approximately in the range of forty-three to sixty-three millimeters. In this case, holders 16 are fastened to the chain 15 in such a manner that in each case, one chain member 17 is disposed between holders 16. The spacing designated by reference numeral 12 is the distance between the midpoints of the adjacent holders, which in this case is sixty-six millimeters.

In the arrangement shown in FIG. 5C, wherein two adjacent chain members 17 are disposed between adjacent holders 16, the so-called "stitch" is eighty-eight millimeters. This arrangement is intended for the processing of preform blanks with diameters in the range of sixty-four to eighty-four millimeters.

The same holders 16 are used in all three of the above cases. They are detachably fastened to chain members 17 by suitable means such as bolts or clips (not shown) for example, and thus can be rapidly converted. In the Figures, a crank or lifting journal 18 extends through the centers of holders 16, which are surrounded by an annular groove and an outside annular recess 20, as shown and explained hereinafter in more detail with reference to FIG. 6.

Figure 6:
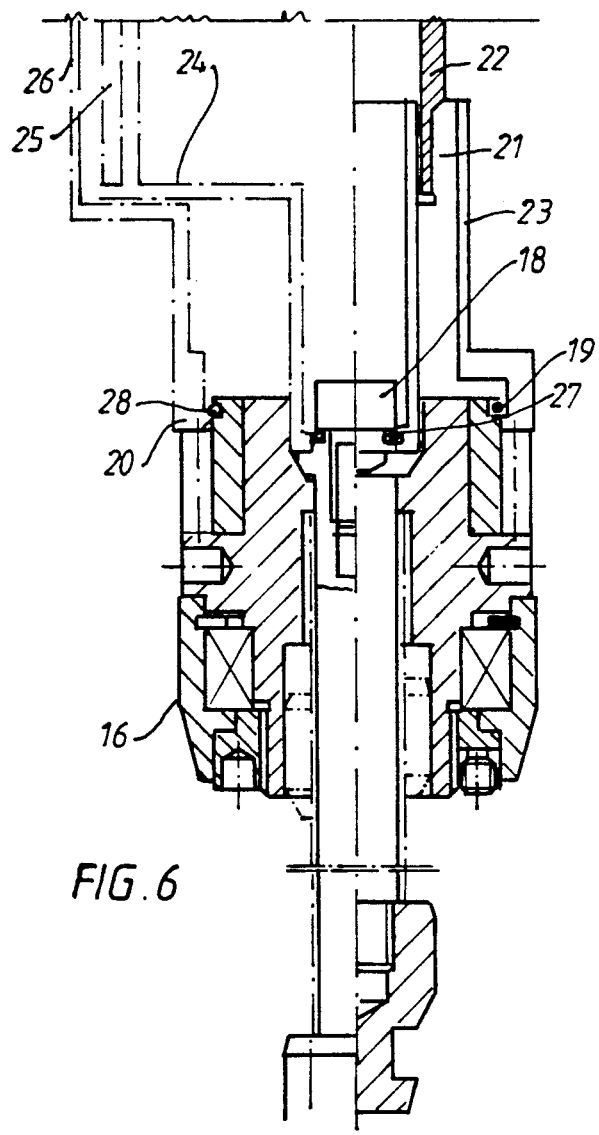
FIG. 6 is a cross sectional view of a holder according to FIGS. 5A, 5B and 5C, to illustrate two different receiving mandrels and reflecting sheathings.

FIG. 6 shows a cross sectional view of holder 16 to which, in the right half of the figure, are fastened a receiving mandrel 21 for a neck segment 22 of a small preform blank. There is also mounted an associated reflecting sheathing 23. The left half of the figure illustrates an outwardly supported receiving mandrel 24 for the mounting of a neck portion 25 of larger diameter and a reflecting sheathing 26 of correspondingly larger diameter. Receiving mandrels 21 (right) and 24 (left) are mounted in the annular groove 19 by means of a snap ring 27 and thus are readily detachable as are also the reflecting sheathings 23 and 26, which are placed in the outside annular recess 20 where they are held by a similar snap ring 28.

From FIG. 6, it will be understood that the crank or lifting journal 18 with the receiving mandrel 21 or 24 attached thereto, and the mounted preform blank can be raised such a distance that the preform blank projects beyond the reflecting sheathing 23 or 26, whereby it is possible for the preform blank to be withdrawn to the side, as is described in greater detail hereinafter.

Figure 7:
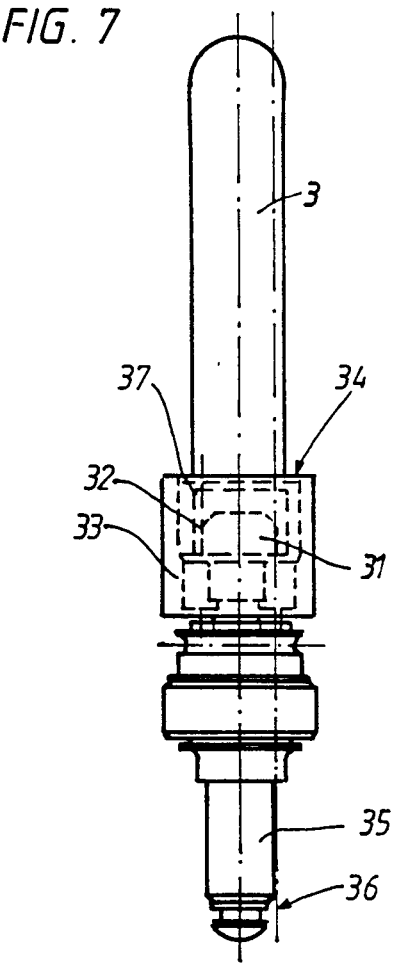
FIG. 7 is a side elevational view of the holder of the preform blank on the conveyor device (not shown).

FIG. 7 shows more individual features of the holder for a preform blank, wherein to hold the neck portion, the holder has a receiving mandrel 31 on which the neck portion 32 of preform blank 3 is mounted so that this neck portion is snugly received in a force fit on mandrel 31. The entire neck portion 32, as shown in FIG. 7, is surrounded by a protective sheathing 33, which is firmly secured in a manner not shown to the chain member, whereby protective sheathing 33 is held immovable relative to that chain member. Between the maximum outside diameter of neck portion 32 and the inside diameter of protective sheathing 33, remains a narrow gap 34 across which practically no heat energy will penetrate by means of convection or radiation. In other words, neither radiation heat nor air heated in the periphery in the vicinity of neck portion 32 will cause any significant heat transfer across gap 34.

Receiving mandrel 31 is connected with a journal 35. A bottom head segment 36 which engages at the pick-up station a lifting device, preferably has a forked contact segment, to raise and lower the holding device whereby, when it is raised is raised a sufficient distance, the bottom edge of neck portion 32 is located above top edge 37 of protective sheathing 33.

When in this condition, the gripper of device 30 for pick-up and transfer of the preform blanks, closes around neck portion 32 and holds it tightly. During the subsequent lowering of lifting journal 35 by the lifting device (not shown), the receiving mandrel 31 is lifted from neck portion 32 of preform blank 3 which is then fed by the device for pick-up and transfer of the preform blanks to the blow mold station 30.

Although we have disclosed our invention, it will be understood that it is capable of other adaptions and embodiments within the scope of the following claims.

Having disclosed our invention, what we claim as new and to be secured by Letters Patent of the United States is:

1. A method for heating cold preform blanks produced by an injection method which are conveyed through heating and cooling sections and afterwards are introduced to a blow molding device for inflation of said preform blanks into hollow articles, comprising the steps of first heating said preform blanks to a temperature below their blow molding temperature, next cooling said preform blanks, then reheating said preform blanks to a temperature wherein the outer aspects of said preform blanks are slightly above their blow molding temperature, next allowing the temperatures between said preform blanks' outer and inner aspects substantially to equalize at said blow molding temperature, and introducing said preforms with their said outer and inner aspects equalized at said blow molding temperatures into a blow mold.

2. A method in accordance with claim 1, wherein said first heating step, said next cooling step and said reheating step are of substantially identical time durations.

3. A method in accordance with claims 1 which includes the method of sorting said injected cold preform blanks and aligning them in one or more paths which are parallel to each other and are defined by conveyor chains, arranging holding mandrels on said conveyor chains that hold and rotate said preform blanks on their axes while simultaneously moving them in the direction of a said blow mold.

* * * * *